Dec. 29, 1931.  O. HÜBNER  1,838,551
JOURNAL BEARING FOR RAIL VEHICLES
Filed March 25, 1930
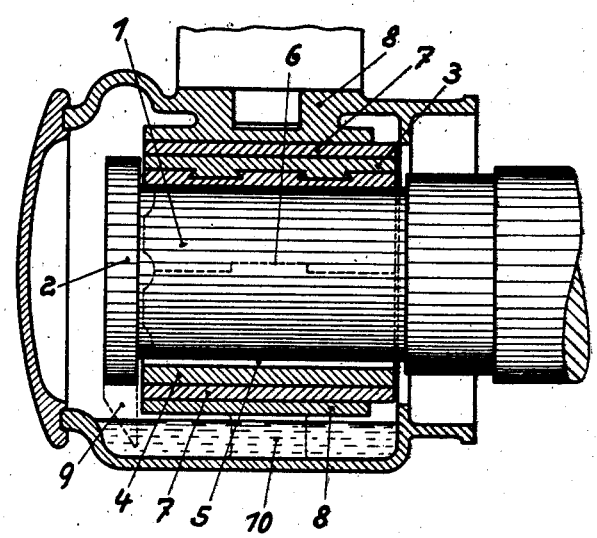
Inventor:
O. Hübner
By: Marks & Clerk
Attys.

Patented Dec. 29, 1931

1,838,551

UNITED STATES PATENT OFFICE

OTTO HÜBNER, OF BERLIN-CHARLOTTENBURG, GERMANY

JOURNAL BEARING FOR RAIL VEHICLES

Application filed March 25, 1930, Serial No. 438,836, and in Germany April 15, 1929.

In the known type of journal bearings of rail vehicles a half-bush is generally being provided which rests above a relatively small arc on top of the journal. The lubrication of this half-bush by means of the lubricant contained in the housing of the bearing below the journal in an oil reservoir, is not always satisfactory. It has therefore been proposed i. e. to use a one-piece cylindrical bush in the place of the half-bush, the inner diameter of which is somewhat larger than the diameter of the journal. In consequence of these different diameters, a sickle-shaped space of little height is being formed at the underside between the journal and the bush which is continuously supplied with oil through the oil grooves. The rotating journal carries this oil upwards so that the formation of an oil film between the bearing surface of the journal and the bush is being secured. Besides, even when the vehicle is at rest the sickle-shaped space will contain a sufficient quantity of oil by adhesion, so as to insure a satisfactory lubrication right at the start.

In spite of its advantages as regards the control of the flow of the lubricant, the cylindrical closed bush has the disadvantage of requiring the use of a journal having no fixed collar, a construction which hitherto is only exceptionally employed in modern railway practice. In order to enable the closed bush to be used in connection with the existing pairs of wheels fixed on the axle, their integral collar had to be turned off and replaced by a detachable collar.

It is the object of the present invention to provide a solution of the problem which makes it possible to use the cylindrical bush in connection with the journals of standard construction. For this purpose the bush is being divided, so as to make it possible to place its parts about the journal past the fixed collar and hold them in position as well as to pass the housing of the bearing over the collar on to the bush.

From the foregoing it will be seen that it is not proposed here to use two half-bushes, but to use a closed bush which has been divided solely for the purpose of its being mounted on a journal having an integral collar which, however, after having been mounted, will be held together by special holding means in such a way as to provide a continuous bush of a somewhat larger diameter than would be required by the diameter of the journal which possesses all the technical advantages essential in the railway service: the supply of oil to the journal is controlled, tilting of the bearing due to a sudden release of the load as a consequence of shocks occurring in actual service, is prevented, a better guide at the start of the rotation of the journal is provided in the case of the collar striking the front face of a closed bush etc. Care must be taken that the two halves, after having been mounted on the journal, are held in position in such a way as to avoid any clearance to be formed between the two halves of the bush. This is the only way of securing a proper control of the feeding of the oil from the sickel-shaped space upwards to under the bearing surface of the bush by adhesion to the rotating journal.

Moreover, such a construction has the advantage over a closed undivided bush that, when the upper half of the bush will be worn out, it may be easily replaced.

The annexed drawing shows a longitudinal section of the invention. For the purpose of a better understanding reference may be had to Patent 469,612. (German.)

The journal is designated by 1, it is provided with the usual integral collar 2. The bush consists of the upper bearing part 3 and the lower part 4 which is out of contact with the journal. Intermediate the journal 1 and the part 4 exists a sickle-shaped space 5. The part 4 has a projection or claw 6 which fits in a corresponding recess in the part 3 so as to prevent any relative displacement of the parts.

The parts of the bush are placed around the journal and held together in any suitable way. Preferably a tightly fitting sleeve 7 or a tubular member is slid upon the parts 3 and 4 which will keep the halves of the bush permanently together. Now, the axle housing may be simply slid upon the sleeve 7 whereby the assembly of the bush will be completed. As will be understood, care must be exercised that any longitudinal displacement of the two halves 3 and 4 of the bush within their sleeve 7 or of the sleeve itself within the axle housing 8, as a result of the stresses occurring in actual service, will be successfully prevented. This may be accomplished in known manner by means of suitably arranged bolts or keys or other known means.

The oil is lifted from the lower oil reservoir 10 by a catcher 9 fixed to the collar of the journal. The downward flowing oil will reach the journal through suitable oil grooves provided on the front side of the halves of the bush. If desired, also backwardly inclined, roof-gutter shaped oil channels may be provided at both sides, about level with the centre of the journal which will distribute the oil supplied from the oil grooves to the front side, along the length of the bearing surface. The excess of the oil will flow down into the space between the journal and the bush whence it will be carried upwards by the journal by adhesion. The space proper is of relatively small height at its bottom end so that the oil will be kept therein by adhesion whilst the vehicle is idle.

From the foregoing it will be seen that the cylindrical bearing-and lubricating bush may be easily mounted also on the existing type of railway rolling stock. Changes and modifications of the invention may be resorted to without departing from the scope of the invention.

Having thus described my invention what I claim as new and desire to secure by Letters Patent is:

1. Journal bearing with oil lubrication for rail vehicles, comprising a journal provided with an end collar, an upper bush influenced by the journal pressure, a lower bush surrounding the lower journal face and separated therefrom by a sickle-shaped space, said bushes encircling the journal as a cylinder, a bearing box holding together said bushes, the diameter of which is greater than the diameter of the end collar, so that the bearing box may be passed over the end collar on said bushes.

2. Journal bearing according to claim 2 comprising a sleeve holding together said bushes and upon which the bearing box is slid.

In testimony whereof I affix my signature.

OTTO HÜBNER.